Feb. 9, 1971        R. B. COSTELLO        3,561,267

BATHYTHERMOMETER

Filed April 10, 1964

INVENTOR
BY Robert B. Costello
Hugh L. Fisher
ATTORNEY

United States Patent Office 3,561,267
Patented Feb. 9, 1971

3,561,267
BATHYTHERMOMETER
Robert B. Costello, Santa Barbara, Calif., assignor to General Motors Corporation, Detroit, Mich., a corporation of Delaware
Filed Apr. 10, 1964, Ser. No. 358,746
Int. Cl. G01k 13/00
U.S. Cl. 73—344          6 Claims

ABSTRACT OF THE DISCLOSURE

An aquatic probe to measure the temperature of a body of water is arranged to travel through the water from a moving ship in a free-fall descent. A coiled electrical conductor, connecting the probe to a recording station on the ship, is payed out from both the probe and the ship in such a manner so that the conductor will have practically no effect upon the descent characteristics of the probe.

---

Figure 1:
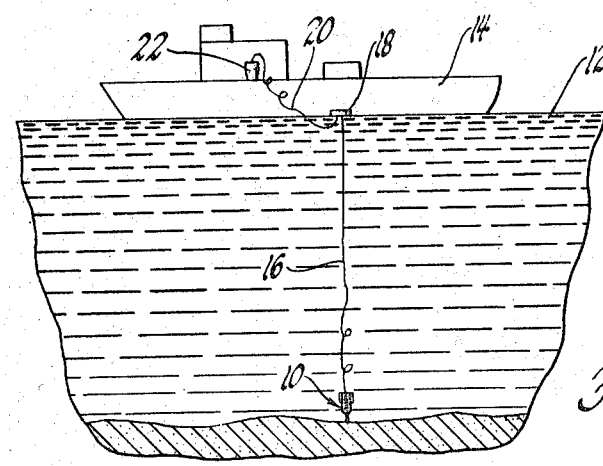

This invention relates to a bathythermometer for providing an indication of the temperature of a body of fluid, such as water, as a function of depth and, more particularly, to such a bathythermometer as may be gravitationally projected through the fluid from a launching station with provision for instantaneously transmitting a signal quantity to the launching station related to the temperature of the fluid adjacent the bathythermometer during the descent thereof.

The prior art shows various techniques for measuring the temperature of a body of fluid such as a lake or ocean. Much of the prior art is devoted to systems for making temperature-depth readings by lowering a temperature sensing device, such as a thermistor, through the body of fluid on the end of a supporting line which is reeled out at a prescribed rate. The thermistor may be connected through the line into a bridge circuit, for example, for giving a reading at the lowering station which corresponds with the temperature of the thermistor as it is lowered through the body of fluid. It is apparent that such a device may only be used with any accuracy when the launching station is stationary with respect to the body of fluid; for example, such a system could not be used on a moving ship since the thermistor would tend to lay out on the water behind the ship, and the reading of depth would be grossly inaccurate.

Another type of bathythermometer is used to measure the temperature of, for example, a body of water, as a function of horizontal displacement. Such a device generally contains a temperature sensing and recording means and is towed along behind a moving ship by means of a cable attachment. This device, of course, provides no information as to the temperature-depth relationship and, of course, must be retrieved before any information is available to the user.

It is an object of the present invention to provide a simple and inexpensive means of obtaining temperature-depth information with respect to a body of fluid, such as a lake or ocean, by means of a hydrodynamically designed vehicle carrying sensing means for providing an electrical signal quantity corresponding with the instantaneous temperature of the fluid adjacent the vehicle. In accordance with the invention, the vehicle is adapted to be gravitationally projected through the body of fluid and, thus, travels in a free-fall descent. To assure the free-fall characteristic of the descent, conductor means for transmitting the electrical signal quantity generated by the sensing means from the vehicle to a surface station is carried by the vehicle in a free-fall bale arrangement to be paid out from the vehicle during descent.

It is a further object of the invention to provide means whereby the temperature-depth characteristic of a body of fluid, such as a lake or ocean, may be accurately obtained at a launching station, such as a ship, which is moving relative to the body at a relatively high rate. This is accomplished by means of the combination of a hydrodynamically designed vehicle carrying sensing means which is gravitationally projected through the body and which transfers information in the form of electrical signals to an intermediate station, such as a surface float, by means of a conductor paid out of the vehicle during the projection thereof, and additional conductor means connected between the intermediate station and the launching station and paid out of the launching station in accordance with the movement thereof relative to the intermediate station.

Figure 2:
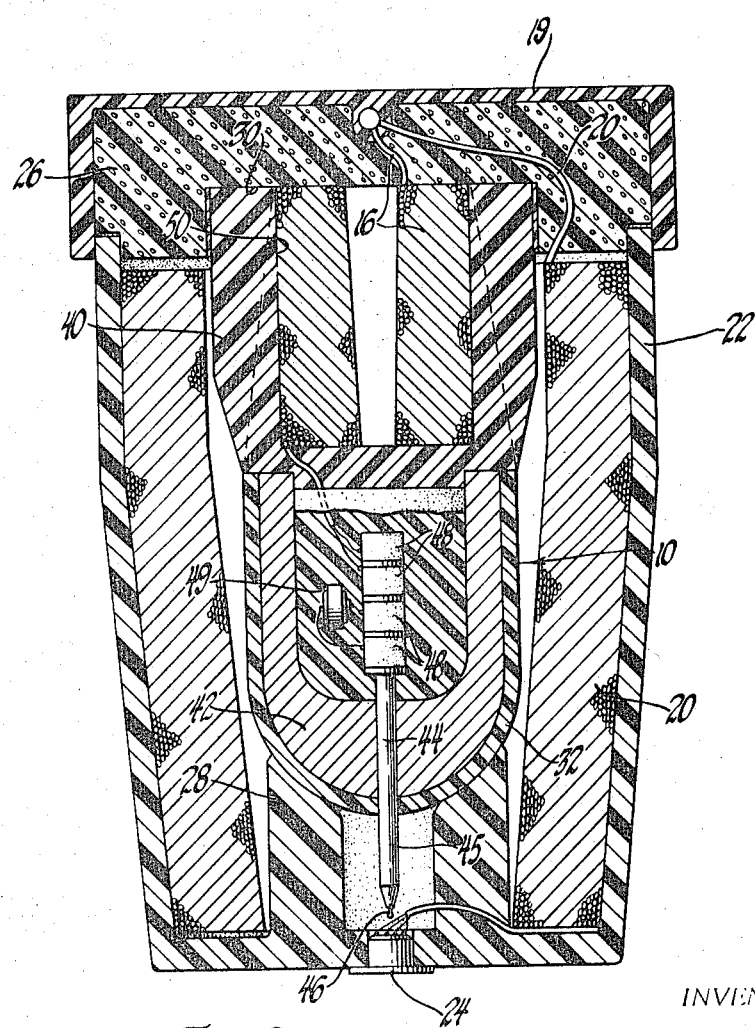

The construction and operation of the invention may be best understood by reference to the following specification which is to be taken with the accompanying drawings of which:

FIG. 1 illustrates one environment in which the subject invention may be used; and FIG. 2 is a cross-sectional view of a specific embodiment of the invention.

The object of the oceanographic study portrayed in FIG. 1 is to obtain information regarding the temperature variations in the ocean as a function of depth. As shown in FIG. 1, this is accomplished by means of a hydrodynamically designed bathythermometer vehicle 10. The vehicle 10 is dropped into the body of water 12 from a launching station represented by a ship 14 which is moving relative to the water. A sensor carried by the vehicle 10 generates a signal quantity as later described related to the temperature of water adjacent the vehicle during the descent thereof. This signal is transmitted back to the ship 14 for analysis by means of the combination of a conductor 16 which is paid out of the vehicle 10 during descent and which is connected to an intermediate station in the form of a surface float 18, and a conductor 20 connected between the float 18 and the ship 14 and which is paid out of the ship 14 in accordance with the movement thereof relative to the water 12. Obviously, where readings are to be taken from a stationary ship, the float 18 may be omitted. Accurate temperature-depth information may be provided by designing the vehicle 10 to have a predetermined terminal velocity through the water which remains constant for the depth for which the device is employed; for example, the vehicle shown in FIG. 1 may be designed to have a terminal velocity of approximately 18.5 feet per second. Since the velocity of the vehicle 10 through the water 12 during descent is known, depth may be calculated as a function of time. Thus, a recording of the signal variations in the waveform transmitted from vehicle 10 to the ship 14 may be made during descent of the vehicle 10 to immediately indicate the temperature-depth characteristic of the body of water 12.

Referring now to FIG. 2, a complete and conveniently transportable package for obtaining information in accordance with the invention is shown. The package includes a cylindrical canister 22 of suitable material such as plastic of a size for accommodating the vehicle 10 and a bale of conductor 20 which is connected between a connector 24 mounted in the bottom of the canister 22 and an end cap 19 which is lined with a flotation material 26. It will be understood that in operation, end cap 19 and material 26 constitute float 18 shown in FIG. 1. The vehicle 10 rests on an annular support 28 which is formed integrally with the canister 22 and is supported against lateral movement by a cylindrical depression 30 in the flotation material 26.

The vehicle 10 is of a hydrodynamic design including a molded plastic nose section 32 and a hollow tail section 40 having a plurality of stabilizing fins thereon. The nose section 32 contains a quantity of lead ballast 42 which may be trimmed in accordance with the desired weight of the vehicle 10. Disposed along the vertical center line of the vehicle 10 is a spindle shaft 44 including a portion 45 which protrudes from the nose of the vehicle. The portion 45 of the shaft 44 carries on the forward end thereof a thermistor 46 which is extremely sensitive to temperature to vary in resistance accordingly. The portion of the shaft 44 which resides within the interior of the nose section 32 carries thereon a plurality of encapsulated resistors 48 which, in combination with the thermistor 46, are connected into a form of the well-known Wheatstone bridge circuit, not shown. The bridge circuit is supplied with energizing potential by a small mercury cell 49 which is held in place by potting compound as shown.

The tail section is hollowed out to form therein a cylindrical rear compartment 50. This compartment is adapted to accommodate a baled conductor 16 which is connected on one end to the bridge circuit including resistors 48 and thermistor 46 and on the other end to the float 18 where it forms a continuous transmission path in cooperation with conductor 20. By means of the cell 49, resistors 48, thermistor 46 and conductor 16, electrical signals generated during descent of the vehicle 10 through the water transmitted back to the float 18 and from the float to the ship 14 by way of conductor 20. The coiled conductor 16, being carried by the vehicle in a free-fall bale configuration, is paid out therefrom during the descent of the vehicle in such a manner as to have practically no effect upon the descent characteristics of the vehicle. With the use of a DC power supply carried by the vehicle 10, as shown in FIG. 2, the conductor 16 carries two insulated wires for transmitting the electrical signal waveform to the launching ship 14. It is to be understood that it may be desirable to employ either an AC or DC power supply at the launching station 14 for supplying power to the Wheatstone bridge circuit from the surface.

In operation, the bathythermometer package is disassembled on board the ship 14 and the combination of the float 18 and the vehicle 10 are launched. The vehicle 10 performs a free fall descent through the water 12 during which descent the conductor 16 is paid out of the compartment 50 in such a manner as to produce a minimum drag on the vehicle 10. As the ship 14 proceeds away from the float 18, conductor 20 is paid out of the canister bale in a similarly dragless manner. During descent the temperature-time curve is recorded and converted into a temperature-depth characteristic by straight conversion of time to depth according to the known terminal velocity of the vehicle 10.

Since the bathythermometer shown in FIG. 2 may be relatively inexpensively manufactured, and, further, since all necessary information is transmitted to the ship 14 during the descent of the vehicle 10, there is no need to retrieve the vehicle and it may be considered expendable.

The construction of the bathythermometer unit shown in FIG. 2 is that of a specific embodiment and is not to be construed as limiting the invention since various additions and modifications to the device will be apparent to those skilled in the art. For a definition of the invention reference should be had to the appended claims.

What is claimed is:

1. A system for measuring the properties of water at various depths from a vehicle moving relative to the water comprising, aquatic probe means containing a sensing element for sensing a property of the water, a first conductor portion coupled to said sensing element and contained within said probe means, said probe means having an interior portion retaining said first conductor portion in wound configuration therein and having one end open for paying out said first conductor portion at a rate substantially equal to the velocity of said probe means through the water, vehicle mounted means for deploying said probe means into the water including a housing, a second conductor portion in a wound configuration within said housing coupled to said first conductor portion, said housing having one end open for paying out said second conductor portion at a rate substantially equal to the velocity of the vehicle relative to the water so that the relative motion of said first and second conductor portions with respect to the water is substantially reduced to zero, and receiving means coupled to said second conductor portion and responsive to said sensing element.

2. The system as recited in claim 1 wherein said first conductor portion is payed out from said probe means substantially parallel to the axis of the winding of said first conductor portion.

3. The system as recited in claim 1, wherein said sensing means is temperature responsive.

4. A disposable unit for use in measuring the properties of water at various depths from a vehicle moving relative to the water comprising, aquatic probe means containing a sensing element for sensing a property of the water, a first conductor portion coupled to said sensing element and contained within said probe means, said probe means having an interior portion retaining said first conductor portion in wound configuration therein and having one end open for paying out said first conductor portion at a rate substantially equal to the velocity of said probe means through the water, a housing adapted to be retained on the vehicle, a second conductor portion in a wound configuration within said housing coupled to said first conductor portion, said housing having one end open for paying out said second conductor portion at a rate substantially equal to the velocity of the vehicle relative to the water so that the relative motion of said first conductor portion and said second conductor portion with respect to the water is substantially reduced to zero, said second conductor portion being adapted to be connected to a receiving means responsive to said sensing element.

5. A disposable unit as recited in claim 4, wherein said sensing means is temperature responsive.

6. A disposable bathythermometer unit for use in measuring the temperature of water at various depths from a vehicle moving relative to the water comprising, aquatic probe means having a temperature responsive sensing element for sensing the temperature of the water, a first conductor means coupled to said temperature responsive sensing element and contained within said probe means, said probe means having an interior portion retaining said first conductor means in wound configuration therein and having one end open for paying out said second conductor means at a rate substantially equal to the velocity of said probe means through the water, a housing adapted to be mounted on the vehicle, a second conductor means in wound configuration retained by said housing, said second conductor means being coupled to said first conductor means and being adapted to be connected to a receiving means responsive to said sensing element, said housing including means for paying out said second conductor means at a rate substantially equal to the velocity of the vehicle relative to the water so that the relative motion of said first conductor means and said second conductor means with respect to the water is substantially reduced to zero.

References Cited

UNITED STATES PATENTS

| 242,278 | 5/1881 | Davidson | 73—300 |
|---|---|---|---|
| 2,465,696 | 3/1949 | Paslay | 181—0.5 |
| 3,098,993 | 7/1963 | Coop | 73—170X |
| 3,221,556 | 12/1965 | Campbell et al. | 73—362 |

FOREIGN PATENTS

| 148,259 | 11/1962 | U.S.S.R. | 73—359 |

LOUIS R. PRINCE, Primary Examiner

D. M. YASICH, Assistant Examiner

U.S. Cl. X.R.

43—4; 73—170

PO-1050
(5/69)

UNITED STATES PATENT OFFICE
CERTIFICATE OF CORRECTION

Patent No. 3,561,267          Dated March 5, 1971

Inventor(s) Robert B. Costello

It is certified that error appears in the above-identified patent and that said Letters Patent are hereby corrected as shown below:

Column 3, line 29, after "section" insert --40--;

Column 4, line 64, "second" should be --first--.

Signed and sealed this 25th day of May 1971.

(SEAL)
Attest:

EDWARD M. FLETCHER, JR.
Attesting Officer

WILLIAM E. SCHUYLER,
Commissioner of Patei